United States Patent [19]
Pricer

[11] Patent Number: 6,094,037
[45] Date of Patent: Jul. 25, 2000

[54] FEEDBACK APPARATUS INCLUDING ULTRA LOW VALVE CURRENT SOURCE

[75] Inventor: Wilbur D. Pricer, Charlotte, Vt.

[73] Assignee: International Business Machines Corporation, Armonk, N.Y.

[21] Appl. No.: 09/099,159

[22] Filed: Jun. 18, 1998

[51] Int. Cl.$^7$ ................................................... G05F 1/44
[52] U.S. Cl. ................................ 323/280; 323/315
[58] Field of Search ........................... 323/312, 313, 323/314, 315, 316, 273, 274, 280

[56] References Cited

U.S. PATENT DOCUMENTS

| | | | |
|---|---|---|---|
| 5,012,133 | 4/1991 | Hughes | 323/315 X |
| 5,028,822 | 7/1991 | Hughes | 323/316 X |
| 5,408,174 | 4/1995 | Leonowich | 323/315 |
| 5,451,861 | 9/1995 | Giebel | 323/315 |
| 5,508,660 | 4/1996 | Gersbach et al. | 331/17 |
| 5,532,915 | 7/1996 | Pantelakis et al. | 363/60 |
| 5,629,650 | 5/1997 | Gersbach et al. | 331/17 |
| 5,694,032 | 12/1997 | Gersbach et al. | 323/315 |
| 5,852,359 | 12/1998 | Callahan, Jr. et al. | 323/274 |
| 5,864,257 | 1/1999 | Rothenberg | 330/253 |

*Primary Examiner*—Jessica Han
*Attorney, Agent, or Firm*—McGinn & Gibb, P.C.; Eugene I. Shkurko, Esq.

[57] ABSTRACT

A feedback apparatus includes a current amplifier for generating a binary error signal corresponding to a received feedback signal, a switched capacitor filter, coupled to the current amplifier, for averaging the binary error signal and providing a voltage reference corresponding thereto, and an output stage, coupled to the switched capacitor filter and to the current amplifier, for outputting a current corresponding to a magnitude of the voltage reference and for providing the feedback signal to the current amplifier.

24 Claims, 6 Drawing Sheets

FEEDBACK APPARATUS INCLUDING ULTRA LOW VALVE CURRENT SOURCE

BACKGROUND OF THE INVENTION

1. Field of the Invention

The present invention generally relates to an integrated circuit having an ultra-low value current source, and more particularly to an integrated circuit incorporating a circuit arrangement for processing sampled analog electrical signals including a feedback apparatus providing an ultra-low value current source (e.g., current reference).

2. Description of the Related Art

Many applications require a plurality of current sources in the microamp to nanoamp region.

For example, portable battery-powered equipment including any of input pin tie-up or tie-down (resistors), key stroke pull-up resistors, current sources, and/or high impedance analog functions (e.g., operational amplifiers, comparators, terminal sensors, etc.) represent applications requiring current sources in the microamp to nanoamp region.

Moreover, stand-by chip power dissipation of less than a microwatt is frequently desired, thereby to reduce power consumption and attendant battery drain. Therefore, individual current sources must be in the nanowatt region. As discussed below, conventional approaches have been impractical or self-defeating.

FIGS. 1A and 1B illustrate first and second conventional examples.

FIG. 1A illustrates a single key pad (e.g., switch) 1 with a pull-up current source. A very high impedance resistor 2 (e.g., having a value of about 100 megohms) forms the current source. A value of a wire and nodal capacitance 3, upstream from an amplifier 4, is on the order of about 10 picofarads (Pfd). The time constant of the node (e.g., approximately 1 millisecond) is adequate for key stroke entry. However, power dissipation (100 nanowatts/ckt.) is undesirably high, and the area required for the resistor 2 is excessive, thereby requiring much chip "real estate" and making the circuit unduly large.

FIG. 1B illustrates a very low current source derived from a much larger current source.

Specifically, a ratioed current mirror is used for providing a smaller current source. A single ratioed current mirror or a cascade of current mirrors 10, 10' and 11, 11' divide and subdivide a well-controlled input current (Vdd)down to an acceptable value (e.g., 10 nanoamps, but of course such a value depends on the application involved). Both transistors of a current mirror pair share the same gate to source potential. Therefore, the currents through the two transistors assume a ratio proportional to their respective W/L ratios.

A resistor 15 is provided as shown to establish the current which is then subdivided. The resistive values of the resistor 15 are reasonably low (e.g., 1 Megohm), and the output current is well-controlled. However, the excessive power consumption of the input reference current overwhelms and defeats the purpose of the low-valued output currents where low power is the primary goal.

Thus, conventional solutions result in either excessive area or excessive and disproportionately higher power, or both.

SUMMARY OF THE INVENTION

In view of the foregoing and other problems of the conventional systems and methods, it is in object of the present invention to provide an integrated circuit having a feedback apparatus and circuit which both consumes less power than the conventional circuits and which takes up less chip real estate.

Another object is to provide a very simple method and apparatus for providing a regulated output current while expending minimal power.

In a first aspect of the present invention, a feedback apparatus includes a current amplifier for generating a binary error signal corresponding to a received feedback signal, a switched capacitor filter, coupled to the current amplifier, for averaging the binary error signal and for providing a voltage reference corresponding thereto, and an output stage, coupled to the switched capacitor filter and to the current amplifier, for outputting a very low current corresponding to the magnitude of the voltage reference and for providing the feedback signal to the current amplifier.

With the unique and unobvious structure of the present invention, current mirror amplification, switched capacitor techniques and digital control of one or more clusters of mirrors, are made possible.

The invention provides a control voltage (e.g., preferably a binary control voltage) obtained from the delay/comparator/ratioed cascaded current mirror circuits which precede the switched capacitor network in the feedback loop, and achieves a very low current and a commensurate, very low power consumption. The invention derives its low power consumption with the inventive structure and with a low duty cycle. Further, the present invention advantageously does not use significantly more current than that which is provided by the current source.

The invention also allows the ultra low power current sources to be replicated in other regions of the chip free of ground and analog signal distribution problems at the cost of very little additional chip real estate.

BRIEF DESCRIPTION OF THE DRAWINGS

The foregoing and other objects, aspects and advantages will be better understood from the following detailed description of a preferred embodiment of the invention with reference to the drawings, in which:

FIG. 1B illustrates a very low current source derived from a much larger current source;

DETAILED DESCRIPTION OF A PREFERRED EMBODIMENT OF THE INVENTION

Figure 1A:
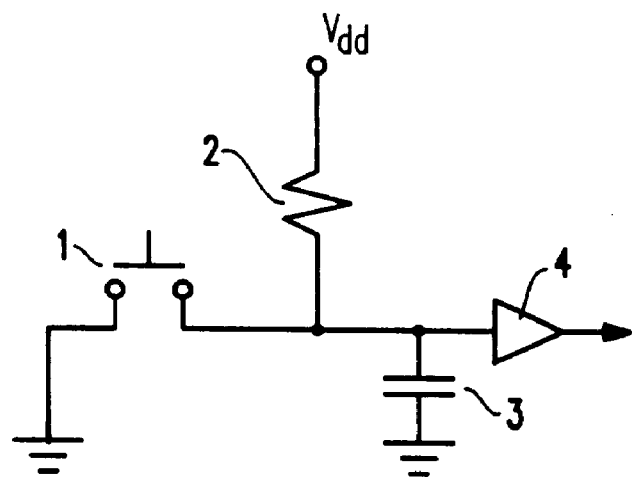
FIGS. 1A and 1B illustrate first and second conventional structures, with FIG. 1A illustrating a single key pad with a pull-up current source
Figure 1B:
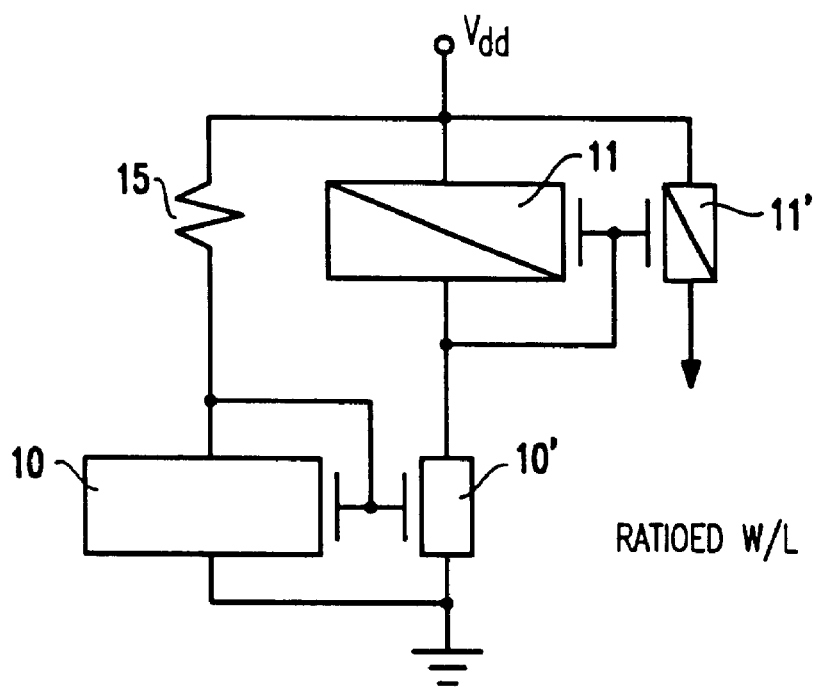

Referring now to the drawings, and more particularly to FIGS. 2A–5, there is shown a preferred embodiment of the present invention.

First, it is noted that the present invention features current mirror amplification, switched capacitor techniques and digital control of one or more clusters of mirrors.

As discussed in further detail below, the present invention is a negative feedback system that regulates the output of a current mirror to some very low value. The feedforward element of the system preferably is a bank of current mirrors whose gates are connected to a reference (e.g., reference Vg).

One of the current outputs of the mirror bank is diverted into the feedback element, which preferably is a current comparator. The current comparator compares the value of the mirror output to a reference, created by arbitrary means (e.g., a resistor and diode-connected FET in one arrangement).

The comparator generates a binary error signal depending on the value of the output mirror current with respect to the reference. The binary error signal is used to update Vg. This analog signal (e.g. Vg) is updated only very infrequently, and the current comparator is powered-down during intervals when this signal is not being updated. This conserves the power associated with generating the reference current.

The analog signal Vg is applied to the current mirror reference voltage via a switched capacitor filter (integrator) with a very large time constant. This enables averaging the binary error signal and the infrequent updating of the reference. Over a large number of cycles, the comparator and filter (integrator) will pump Vg to the voltage required to make the mirror output current match the reference.

Figure 2A:
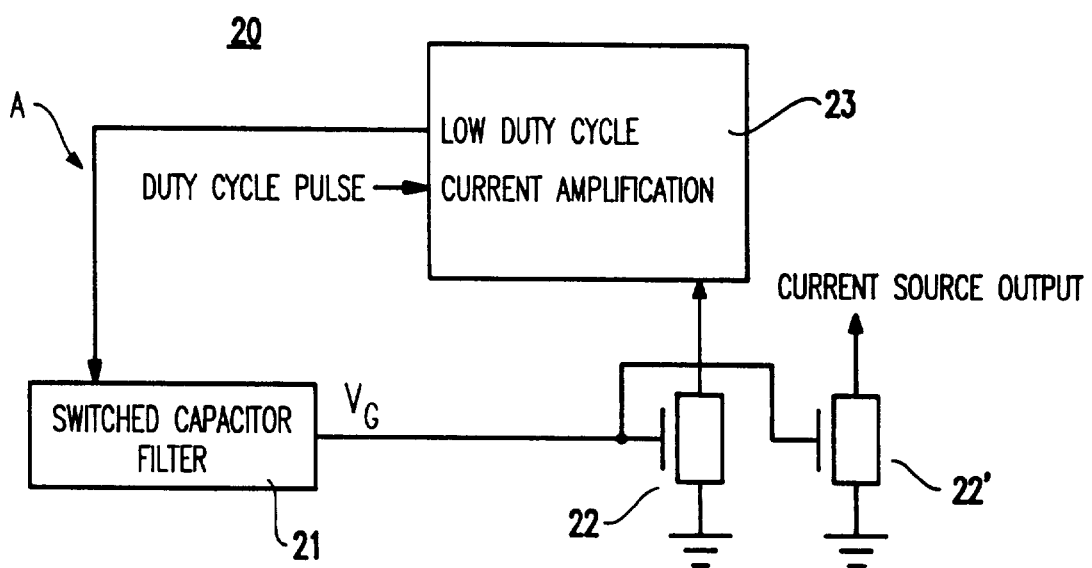
FIG. 2A is a block diagram of the inventive structure.

FIG. 2A is a block diagram of the inventive structure, including a circuit 20 having a switched capacitor filter 21 for providing an analog control voltage Vg, current sources (FETs) 22 and 22' for providing a reference current output, and a low duty cycle current amplification device 23 including current mirrors (not shown) and a comparator (not shown). Such devices may be formed on a single chip. The lowest value current carrying transistors may be made preferably using closed structures.

A duty cycle pulse from a clock (not shown in FIG. 2A) is input to the current amplification mechanism 23 for receiving the current source outputs from the current sources 22. The duty cycle pulse constrains the amplified current to flow only infrequently and for short periods.

An output from the duty cycle current amplification mechanism 23 represents a control voltage (e.g., a binary error signal) input to the switched capacitor filter 21. The binary voltage signal has either a "1" or "0" value, and turns the switched capacitor filter "ON" and "OFF", thereby to synthesize the reference voltage (Vg) and to apply the same to the current source cluster to establish a matching output current.

The functions provided by the current mirrors and comparator (e.g., low duty cycle current amplification) are shared by all the current sources 22 on the chip. Likewise, the analog control voltage provided by the switched capacitor filter(s) (e.g., networks shown in FIG. 2B) service many current sources 22 within a localized cluster. If all the current sources 22 are confined to one locality, only a single switched capacitor filter (network) 21 may be necessary.

Figure 2B:
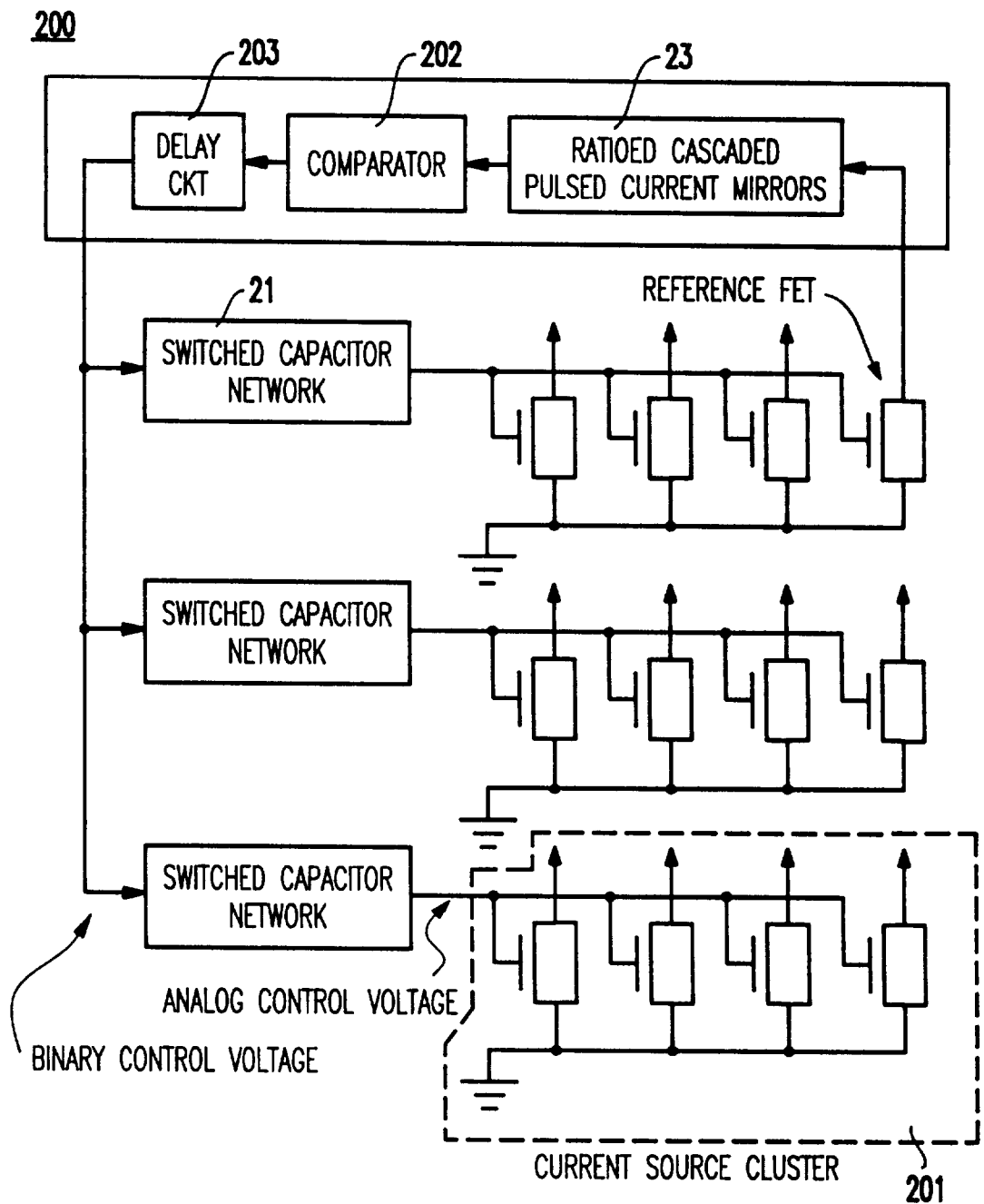
FIG. 2B illustrates a structure employing a plurality of the inventive structures including a comparator and an optional delay circuitry.

FIG. 2B illustrates a network 200 including a plurality of clusters 201 of current sources and including the inventive structure shown in FIG. 2A, as well as clearly illustrating ratioed cascaded pulsed current mirrors 23 for current amplification and a comparator 202. Moreover, an optional delay circuit 203 is provided between the comparator and the input to the switched capacitor network 21.

A switched capacitor network 21 is provided for each cluster 201, as shown. One of the current sources (e.g., an end current source) is a reference FET which provides an input to the current mirrors 23. The inputs from the other FETs in FIG. 2B provide the ultra low power ultra low current sources of the present invention.

The invention is best understood by examining the blocks, and tracing the control around the feedback loop.

Figure 3:
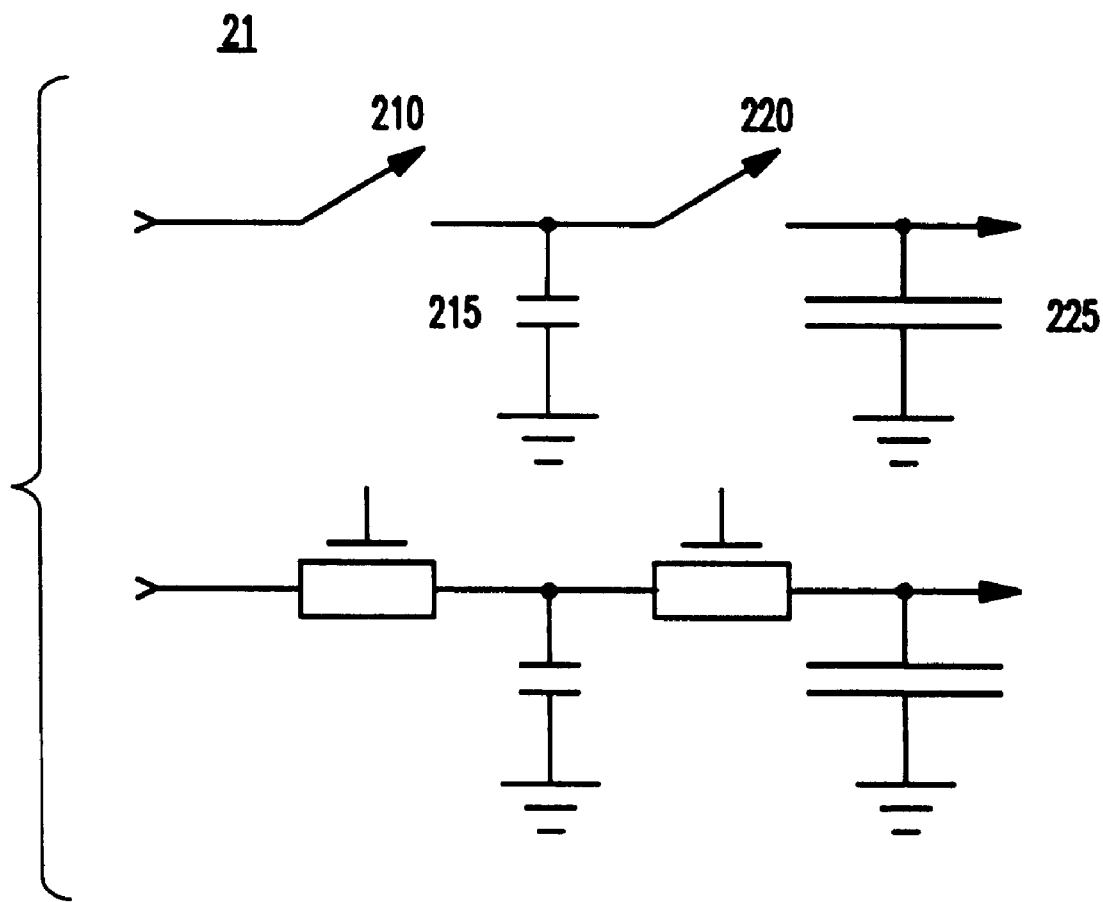
FIG. 3 illustrates a switched capacitor network suitable for deriving an analog voltage from a binary error signal, which is fed to a cluster of current sources and illustrates how the present invention can be employed.

FIG. 3 illustrates an exemplary construction of the switched capacitor network 21 of FIG. 2B, suitable for deriving an analog voltage which is fed to a cluster of current sources. All the FET drain current vs. gate-to-source voltage characteristics will be closely matched across the chip. Indeed, if these FETs are operated in the subthreshold region, such characteristics will be more closely matched than those in the saturated region.

Specifically, such matching occurs because the drain current above threshold has a first order dependence of Tox (e.g., thin gate oxide) of the current source 22. In the subthreshold region, the current is largely dependent of Boltzmann statistics and is nearly independent of Tox. Generally, Tox is the largest contributor to FET device characteristic tolerance. Good design practices including closed device structures, and avoidance of very short channel devices, should be observed to conserve this FET characteristics matching advantage. These techniques preserve transistor matching and current mirror proportions.

Preferably, the switched capacitor network 21 includes first and second switches 210, 220 and first and second capacitors 215, 225, as shown in FIG. 3. It is noted that the upper diagram of FIG. 3 illustrates the principle of operation of the structure, and the lower diagram illustrates an exemplary embodiment. Thus, the lower diagram is substantially the same as the upper diagram but the switches are shown as N-channel FETs as opposed to schematically.

The switched capacitor network 21 adjusts the analog voltage every few tens of milliseconds. Thus, the output of the switched capacitor network 21 is an analog control voltage which is slowly varying. The output of network 21 depends on the voltage supplied and the recent "error" chain (e.g., "1s" and "0s" being provided thereto). The sample period is very short, typically a few nanoseconds.

As shown in FIG. 3, switch 210 copies the binary control signal onto capacitor 215. Switch 220 then shorts capacitor 215 to a much larger capacitor 225. In this illustration, the capacitance of capacitor 225 is much larger (e.g., 50 times or more) than the capacitance of capacitor 1. Smaller capacitor ratios and more sophisticated filtering of the analog control voltage are possible with more complex switched capacitor networks.

In the example of FIG. 3, the voltage on the second capacitor 225 directly controls the gate inputs of the clustered FET current sources 22 shown in FIG. 2B. The analog voltage stored on capacitor 225 and fed to the gates of all the FET current sources 22 within a cluster 201, is a result of many preceding sample cycles.

Within each sample cycle, the voltage on capacitor 215 can increment or decrement the voltage on capacitor 225 by some small amount (e.g., typically 1–2%) in response to the binary control voltage input to the switched capacitor network 21.

As described above, the binary control voltage is obtained from the delay(optional) 203/comparator 202/ratioed cascaded current mirror circuits 23 which precede the switched capacitor network 21 in the feedback loop.

Figure 4:
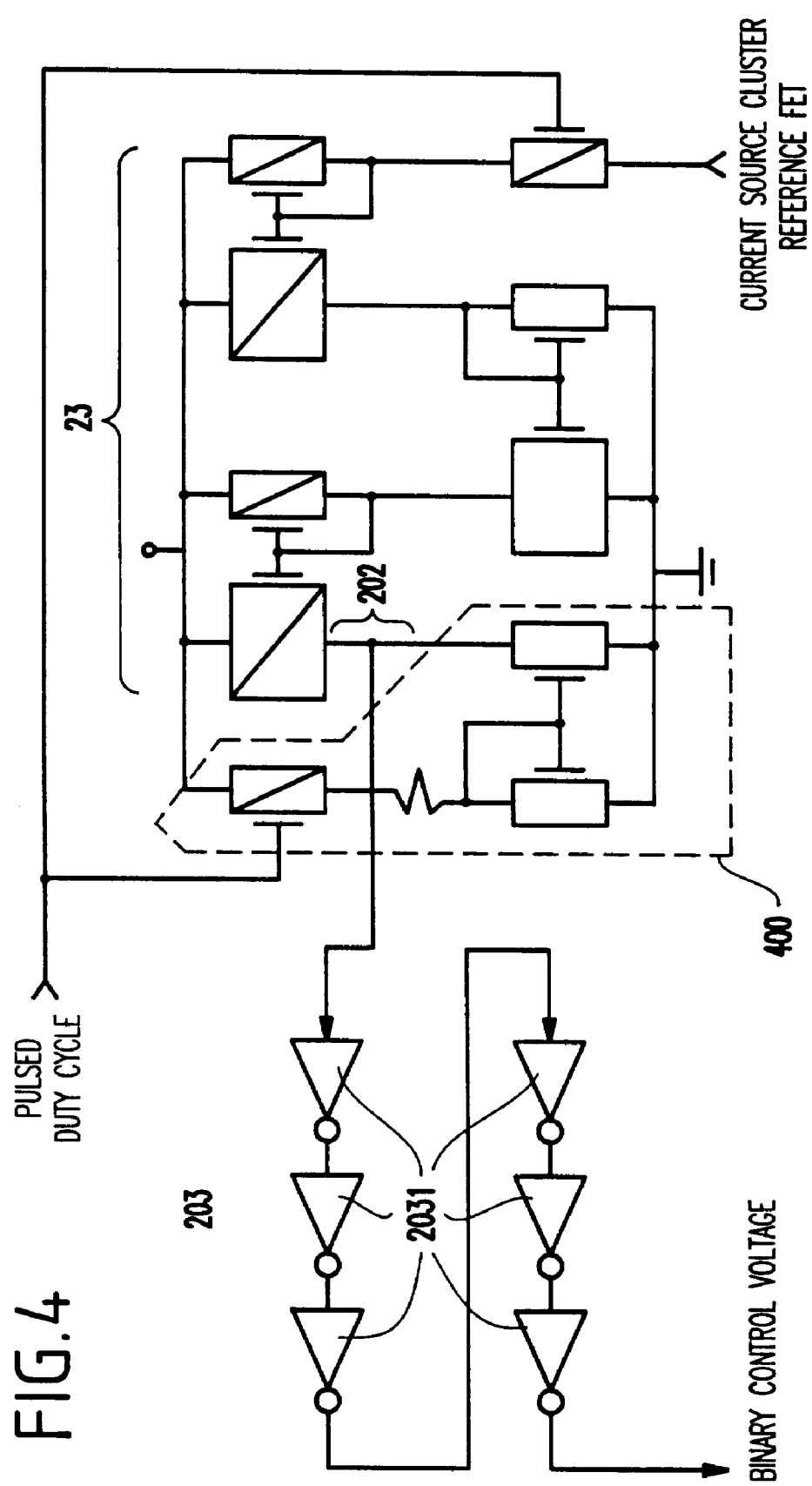
FIG. 4 illustrates a preferred embodiment of the present invention in which delay (optional)/comparator/ratioed cascaded current mirror circuits precede the switched capacitor network in the feedback loop and are provided in combination in one circuit.

It is noted that, although these three functions are shown separately, the functions may be conveniently designed into one circuit. FIG. 4 illustrates an embodiment in which such functions are provided in combination.

The function provided by FIG. 4 requires another sampling period which directly precedes the sampling period of the switched capacitor network 21. This sampling period is longer, typically a few microseconds, to allow adequate time for the lowest value current mirror 23 to stabilize. For example, of the customary values/range of values of the current mirrors 23, the lowest is nanoamps and the intermediate values will be microamps.

The invention derives its low power consumption by the low duty cycle of FIG. 4. The circuit function of FIG. 4 is turned "ON" for a few microseconds (e.g., substantially within a range of about 1 μsec to about 10 μsec) and turned "OFF" for a few milliseconds (e.g., substantially within a range of about 1 millisecond to about 100 milliseconds) to achieve a duty cycle (e.g., ratio of "ON" to "OFF") of 1000:1 or more.

In FIG. 4, all the functions can be obtained from conventional well-understood circuit building blocks, as would be well within the grasp of one of ordinary skill in the art within the context and purview of the present application.

Pulse-gated current amplification is obtained from a cascade of current mirrors 23 of conventional design and operation. The "comparator" 202 may simply be an extension of the current mirrors, as shown in FIG. 4, and the function of the comparator is integrated into the current mirrors. As shown in FIG. 4, the present invention "extends" the current mirrors to provide a comparator function, as shown by the dotted line box 400 in FIG. 4 in which an additional current mirror has been added which can be ratioed or unratioed.

The "delay" is obtained from a cascade of inverters 2031 which may be intentionally slow (e.g., substantially providing a delay within a range of about 1 nanosecond to about 100 nanoseconds) which further sharpen the comparator's characteristics, while delaying the output of the circuit long enough to envelope the sample period of the switched capacitor network 21. Only a few nanoseconds of delay are necessary. In most implementations involving large gain (~1000), the current source and comparator circuitry can provide this delay inherently (e.g., without dedicated, physical delay elements). Thus, indeed, the response time of the cascaded current mirrors 23 will be sufficient to provide this delay for most designs. The ratioed cascaded pulsed current source constitutes the output stage of the inventive structure.

Figure 5:
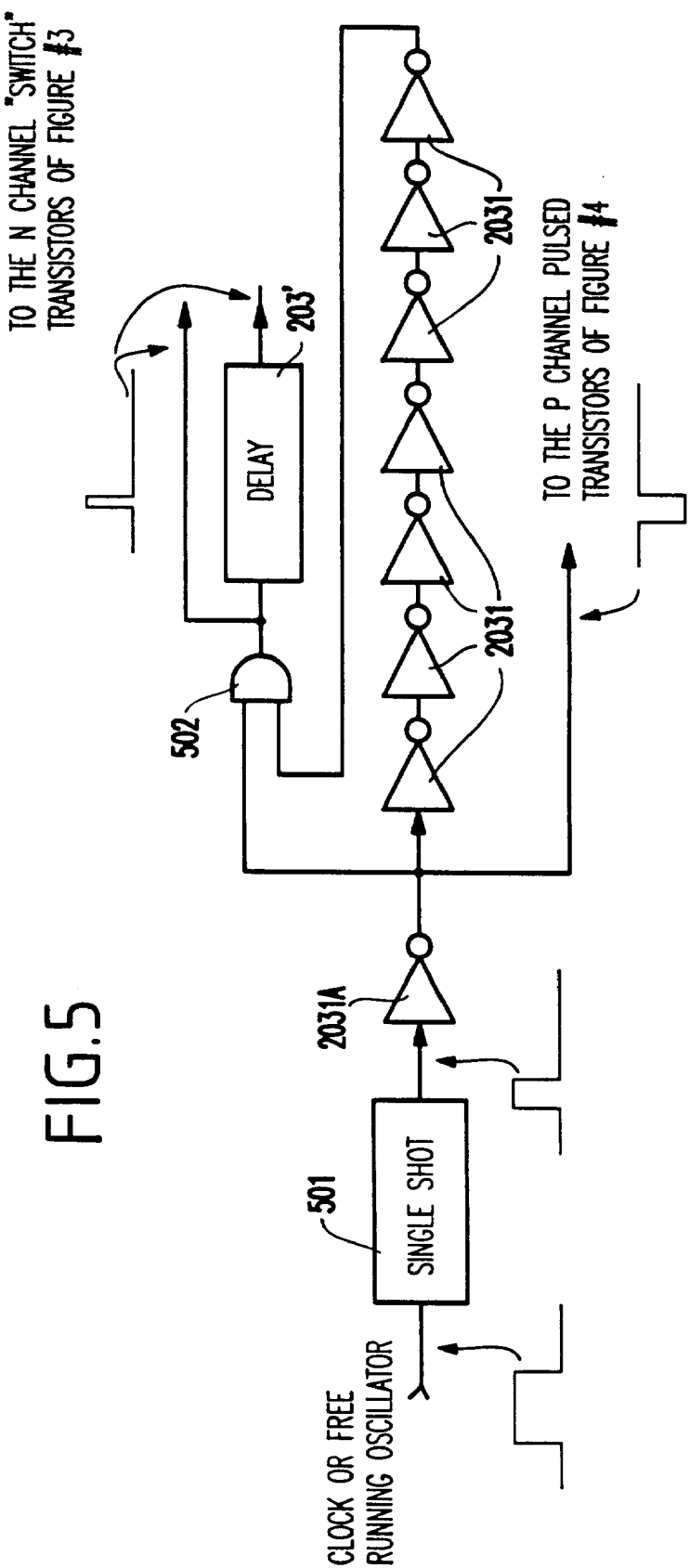
FIG. 5 illustrates an example of timing circuits for providing sampling periods.

The invention requires two sample periods, which can be conveniently derived from the clock if one is present. FIG. 5 shows one such illustrative example of timing circuits for providing sampling periods.

In the structure of FIG. 5, a clock or a free running oscillator pulse is input to a single shot pulse generator 501 or the like. The single shot pulse is generated and provided to a first input of an AND circuit 502, to a first inverter 2031A of the plurality of cascaded inverters 2031 of the delay circuit 203, and to the P-channel pulsed transistor shown in FIG. 4. The output of the final inverter of the delay circuit is provided to a second input of the AND circuit 502. The output of the AND circuit 502 is provided to a delay element 203' (e.g., having a construction similar to that of delay circuit 203), with the outputs of the delay circuit 203' and AND circuit 502 being provided to the N channel "switch" transistors shown in FIG. 3.

The concept of the present invention may be extended in various ways.

For example, the current sources 22 do not all need to have the same size. The analog voltage developed by the switched capacitor network 21 is of the proper amplitude to produce the desired ultra low value in the reference FET 22'. Other FFTs of other sizes, when supplied with this same analog voltage will deliver currents of appropriately different magnitudes.

Likewise, switched capacitor networks 21 with differing ratios of capacitors 215 and 225 will produce different output analog voltages which track to the monitored current in the reference FET. Those differing analog voltages can be used to control other FET current sources with substantially higher or lower output currents than that of the reference FET.

If a convenient clock is unavailable, one or more current sources provided by the invention may be part of a free running oscillator that triggers the sample periods. In this embodiment, care must be taken that the oscillator is made self-starting at power-on when the output current sources may be "out of range".

The duty cycle may be adjusted during powering up periods so that sample periods initially occur more closely spaced. This will allow the invention to more quickly seek the desired current source values. During sustained operation, the duty cycle would revert to a smaller value (e.g., such as one microsecond sample in a ten millisecond period depending on the application of the invention) for low sustained power dissipation.

Additionally, the control signal to the switched capacitor networks 21 has been shown, exemplarily, as a "binary control voltage". With proper selection of current mirror gain, and capacitor values, the control voltage may be "binary" only during the initial adjustments. As the invention settles into steady state operation, this feedback control voltage may become more analog-like. Therefore, the feedback control voltage of the present invention is capable of making finer adjustments.

While the invention has been described in terms of a single preferred embodiment, those skilled in the art will recognize that the invention can be practiced with modification within the spirit and scope of the appended claims.

For example, while the present invention is especially applicable to low power analog circuit design, the present invention is not limited to such applications.

What is claimed is:

1. A feedback apparatus comprising:
   a current amplifier for generating a binary error signal corresponding to a received feedback signal;
   a switched capacitor filter, coupled to said current amplifier, for averaging the binary error signal and providing a voltage reference corresponding thereto; and
   a current source, coupled to said switched capacitor filter and to said current amplifier, for outputting a current corresponding to a magnitude of the voltage reference and for providing the feedback signal to said current amplifier.

2. The feedback apparatus according to claim 1, wherein said current amplifier comprises a low duty cycle current amplifier for consuming low power and for producing a pulsed output.

3. The feedback apparatus according to claim 1, wherein said current source comprises a mirrored bank of current sources.

4. The feedback apparatus according to claim 1, wherein said current source comprises a plurality of mirrored field effect transistors (FETs).

5. The feedback apparatus according to claim 1, wherein said switched capacitor filter provides an analog control voltage, and wherein said current source includes a plurality of field effect transistors (FETs) having one of a same size and at least one FET having a different size from others of said FET.

6. The feedback apparatus according to claim 1, wherein said binary error signal input to said switched capacitor filter is for making infrequent digital corrections, thereby to synthesize the reference voltage and to apply the reference voltage to said current source to establish a matching output current.

7. The feedback apparatus according to claim 1, wherein said current amplifier includes a comparator.

8. The feedback apparatus according to claim 7, further comprising a delay circuit provided between said comparator and said switched capacitor filter.

9. The feedback apparatus according to claim 1, wherein said current source comprises a plurality of current sources, one of said current sources being a reference field effect transistor (FET) for providing the feedback signal to said current amplifier.

10. The feedback apparatus according to claim 1, wherein said switched capacitor filter includes first and second switches, and a first capacitor coupled to a node between said first and second switches and a second capacitor mounted downstream of said second switch.

11. The feedback apparatus according to claim 10, wherein said first switch copies the binary error signal onto said first capacitor, and thereafter said second switch shorts said first capacitor to said second capacitor, said second capacitor being larger than said first capacitor.

12. The feedback apparatus according to claim 11, wherein said second capacitor has a capacitance about 50 times or more than that of said first capacitor.

13. The feedback apparatus according to claim 12, wherein said current source comprises clustered field effect transistor (FET) current sources, and wherein a voltage on the second capacitor directly controls gate inputs of the clustered FET current sources, an analog voltage stored on said second capacitor and fed to the gates of all the FET current sources within a cluster resulting from a plurality of preceding sample cycles.

14. The feedback apparatus according to claim 13, wherein, within each sample cycle, the voltage on said first capacitor increments or decrements the voltage on said second capacitor by a predetermined value no more than 2% of the voltage on said second capacitor, in response to the binary error signal input to said switched capacitor filter.

15. The feedback apparatus according to claim 12, wherein said delay circuit includes a plurality of inverters coupled together in series.

16. The feedback apparatus according to claim 12, wherein said current amplifier includes a delay provided inherently therein.

17. The feedback apparatus according to claim 1, wherein said feedback apparatus provides a predetermined low power consumption by a duty cycle of at least 1000:1.

18. The feedback apparatus according to claim 17, wherein said duty cycle is adjustable during a powering-up period so that sample periods initially occur more closely spaced and such that during sustained operation, the duty cycle becomes a smaller value.

19. The feedback apparatus according to claim 1, wherein said binary error signal comprises a binary control voltage having a binary value only during an initial adjustment period of said feedback apparatus, and such that, as the feedback apparatus settles into steady state operation, said binary error signal becomes an analog control voltage.

20. The feedback apparatus according to claim 1, wherein said current source comprises a plurality of current sources, the current sources having one of a same size and a different size, when supplied with a same reference voltage, for delivering currents of different magnitudes.

21. The feedback apparatus according to claim 1, wherein said current source comprises a plurality of current sources, and wherein a switched capacitor network is provided including a plurality of switched capacitor filters, said switched capacitor filters including differing ratios of first and second capacitors, to produce differing output analog voltages which track a monitored current in a reference current source of said plurality of current sources.

22. The feedback apparatus according to claim 21, wherein said differing output analog voltages are for controlling other current sources of said plurality of current sources with substantially higher or lower output currents, respectively, than that of the reference current source.

23. A low power, low current, current source, comprising:

an amplifier for generating a control voltage signal corresponding to a received signal;

a switched capacitor filter, coupled to the amplifier, for averaging the control voltage signal and providing a voltage reference corresponding thereto; and an output stage, coupled to the switched capacitor filter and to the amplifier, for outputting a current corresponding to a magnitude of the voltage reference and for providing the received signal to the amplifier.

24. The current source according to claim 23, wherein said control voltage comprises a binary error signal, and said received signal comprises a feedback signal.

* * * * *

UNITED STATES PATENT AND TRADEMARK OFFICE
CERTIFICATE OF CORRECTION

PATENT NO. : 6,094,037
DATED : July 25, 2000
INVENTOR(S) : Wilbur D. Pricer

It is certified that error appears in the above-identified patent and that said Letters Patent are hereby corrected as shown below:

On the cover page, section [54], change "FEEDBACK APPARATUS INCLUDING ULTRA LOW VALVE CURRENT SOURCE" to --FEEDBACK APPARATUS INCLUDING ULTRA LOW VALUE CURRENT SOURCE--.

Signed and Sealed this

Twenty-second Day of May, 2001

Attest:

NICHOLAS P. GODICI

*Attesting Officer*     *Acting Director of the United States Patent and Trademark Office*